April 7, 1942.    F. W. BRAENDEL    2,278,411
SCREW
Filed June 26, 1939
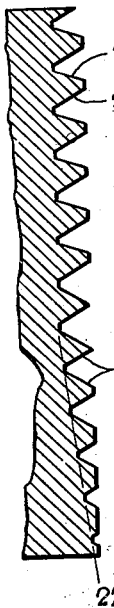
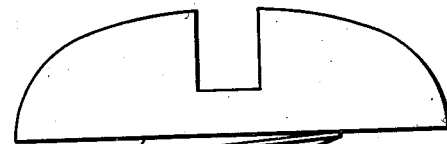
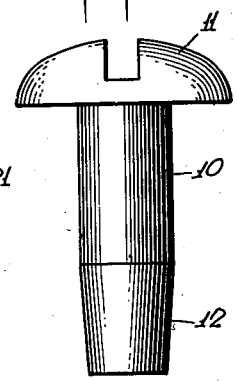
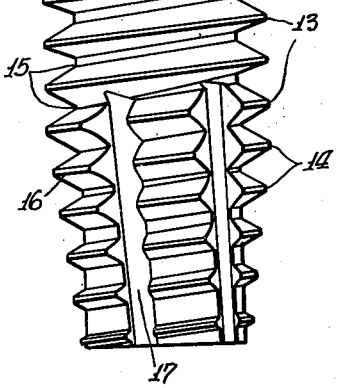
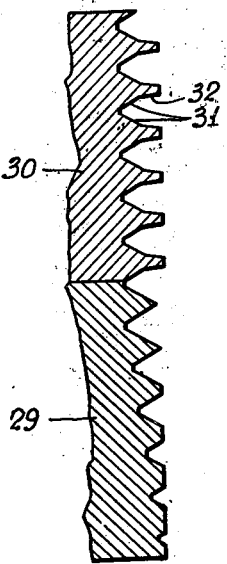
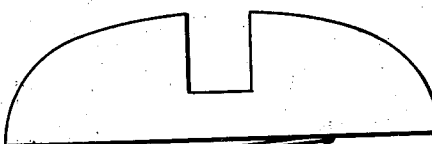
INVENTOR
*Felix W. Braendel*
BY
*Dean Fairbank & Hirsch*
ATTORNEYS Patented Apr. 7, 1942

2,278,411

UNITED STATES PATENT OFFICE 2,278,411

SCREW

Felix W. Braendel, Union City, N. J., assignor to Groov-Pin Corporation, Union City, N. J., a corporation of New York Application June 26, 1939, Serial No. 281,167

6 Claims. (Cl. 80—61)

The present invention relates to self-cutting screws of the rolled type.

Among the objects of the invention are to provide screws of the above character capable of being prepared by a single rolling action from an inexpensive unstepped blank that is of uniform shank diameter with a tapered pilot and in which the shank of the screw will nevertheless have an effective locking hold in the hole tapped by the pilot.

In the accompanying drawing in which is shown one or more of various possible embodiments of the several features of the invention, Fig. 1 is a side elevation of one embodiment of the screw, Fig. 2 is a fragmentary sectional view of a die used for rolling the screw of Fig. 1.

Fig. 3 is a view similar to Fig 1 of another embodiment of screw,

Fig 4 is a view similar to Fig. 2 of one of the dies for the latter embodiment, and Fig. 5 is a view on a smaller scale of the blank for rolling the screw.

Referring now to Figs. 1 and 5, the screw is made from a blank with an unstepped cylindrical shank 10 headed as at 11 and with a tapered pilot end 12.

The screw rolled from said blank as shown in Fig. 1, has a thread of uniform outer diameter 13 along the shank and of gradually reduced outer diameter as at 14 along the pilot. The root diameter 15 of the thread is uniform from the lower pilot end to the head of the shank.

The pilot has rolled thereinto substantially lengthwise of the screw and in relation to traverse the thread 16, thread cutting grooves 17, which may be similar in character to those of my copending application Serial No. 279,599, filed June 17, 1939.

The screw being made by rolling as indicated in said prior application, it is apparent that there is brought about an enlargement of the thread diameter at the pilot due to the displacement of the metal pressed outward in forming the grooves. As a consequence, the shank of the screw where the unstepped blank such as shown in Fig. 5 is employed, since it is devoid of any such grooves, would, if provided with conventional threads have an effective diameter smaller than the maximum diameter of the pilot and as a consequence the shank would not have effective locking engagement in the hole tapped by the cutting pilot.

According to the embodiment of Fig. 1, the upper side of the thread as at 18 has the same radial inclination as the corresponding side of the thread along the pilot, illustratively an angle of thirty degrees. The lower face, however, of the thread on the shank instead of the conventional angle of thirty degrees, extends at a lesser angle with respect to the horizontal thereby affording a flat 19 between said face and the upper face of the next lower thread convolution. The volume of the thread is thus reduced by that of a helix of the wedge-shaped cross-section shown at 20.

Preferably, the angle at the lower face of the thread by which the added displacement of material along the shank is brought to pass, is such, illustratively 18 degrees, that the added displacement is substantially equal to or if desired, greater than that due to the material displaced by the cutting grooves 17 along the lower or pilot end of the screw. Accordingly, in the thread rolling operation, the additional metal displaced in forming the thread, as compared to what would be displaced in forming the conventional thread, affords an enlargement of the outer diameter of the screw, which enlargement compensates for that due to the impression of the cutting grooves into the pilot and assures a secure fit of the shank in the hole tapped by the cutting pilot.

In the screw of Fig. 1, it is seen that the root diameter of the shank remains equal for the whole length of the screw, which is of course a desirable relation and the upper portion of the thread remains at the standard 30 degrees radial angle, so that when the screw is inserted, the upper surface of the helix will make a secure surface contact with the standard surface thread cut by the cutting or pilot section of the screw.

In Fig. 2 is shown one of the dies for rolling the screw, in which it will be seen that the thread rolling ribs are cut symmetrically as at 21 at the lower or pilot end, the roots of said ribs extending progressively upward to nearer the surface as shown at 22 to afford a gradual reduction in thread diameter at the pilot. The ribs at the upper or shank forming part of the die have the assymetrical relation indicated, the inclination at the lower face 23 of each rib being 30 degrees and that at the upper face 24 at the lesser angle of 18 degrees.

The embodiment of Fig. 3 like that of Fig. 1 is rolled from the blank shown in Fig. 5 and differs from Fig. 1 in that the effective thread diameter along the shank has the standard inclination of 30 degrees to the horizontal both at the upper and the lower face of the thread. However, the added displacement of material to compensate for the enlargement of diameter due to the displacement of the material in forming the cutting grooves at the pilot end is brought to pass as indicated, by reducing the root diameter 26 along the shank to somewhat below the maximum root diameter at the pilot as indicated, and by affording a smaller taper of the walls of the threads near the root diameter, as indicated at 27. Accordingly, additional material is displaced as compared to what would be displaced if the thread were conventional. That additional volume is that of the helix having the generally pentagonal cross-section shown at 28. As a consequence, the outer diameter of the shank threads is enlarged due to such displacement to compensate for the enlargement at the pilot end due to the impression of the cutting grooves. In this embodiment also, it is desirable that the added displacement of the material at the shank shall be equal to or greater than that due to the impression of the cutting grooves at the pilot.

The die shown in Fig. 4 is desirably made of two blocks 29 and 30, die 29 corresponding to the lower half of the die shown in Fig. 2 and the upper element 30 which forms the shank having a profile complementary to that of the screw shank, as shown, in which the symmetrical thread forming sides 31 have extensions 32 more nearly horizontal as shown.

As many changes could be made in the above method and construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. The method of rolling a self-cutting screw from a blank having a cylindrical shank, which consists in rolling a thread about the entire length thereof with substantially uniform thickness of apex and simultaneously rolling longitudinal grooves along the lower part of the length of said blank to form a cutting section and displacing metal from the shank beyond said cutting section to enlarge the thread diameter thereat, thereby to compensate for the enlargement of cutting section diameter due to the impression of the longitudinal grooves therein.

2. The method of rolling a self-cutting screw from a headed blank with a tapered pilot and a shank of uniform diameter, which consists in rolling a thread about the shank and pilot with substantially uniform thickness of apex throughout the length thereof and simultaneously rolling longitudinal grooves at the pilot end to form a cutting section, and displacing metal from the shank to enlarge the thread diameter beyond the cutting section to compensate for the enlargement of cutting section diameter due to the impression of the longitudinal grooves therein.

3. A self-cutting rolled screw having a shank and being threaded for the entire length thereof and having longitudinal cutting grooves along the lower part thereof beyond said shank, the thread along the shank being modified in profile as compared with the thread along the said lower part for outward displacement of material and consequent enlargement of thread diameter thereat, to correspond to the enlargement at the cutting section due to the impression of the cutting grooves, the thickness of the apex throughout the length thereof being substantially uniform.

4. A self-cutting rolled screw having a tapered pilot, a thread of uniform pitch extending from end to end of said screw, transverse cutting grooves traversing the thread along at least the length of the tapered pilot, the root diameter of the shank being reduced with respect to that of the upper end of the cutting grooves for corresponding enlargement of the outer diameter, to compensate for the enlargement of the cutting section diameter due to the impression of the longitudinal grooves the apex of the thread being substantially uniform in thickness throughout the length thereof.

5. A self-cutting screw which is the product of rolling a headed blank of uniform shank diameter with tapered pilot, said screw having a thread of uniform pitch extending from end to end thereof, the pilot being traversed by longitudinal cutting grooves, the thread along the shank having a root diameter which is uniform for the length of the screw, and having an upper screw face inclined at the same angle as the corresponding screw face of the pilot and having its lower screw face at a more acute angle, for displacement of material to effect enlargement of the outer diameter of threads along the shank to compensate for the enlargement of diameter at the cutting section due to the impression of the grooves.

6. A self-cutting screw which is the product of rolling a headed blank of uniform diameter with tapered pilot, said screw having a thread of uniform pitch extending from end to end thereof and having impressed longitudinally cutting grooves along the pilot, the threads along the pilot being of progressively smaller diameter and having progressively larger spacing therebetween, the threads along the shank being uniformly spaced with intervening flats of uniform width along the shank thereof the apex of the thread being substantially uniform in thickness throughout the length thereof, the profile of the thread along the shank differing from that at the upper end of the pilot to afford displacement compensating for that of the impressed cutting grooves.

FELIX W. BRAENDEL.